US010019363B2

(12) United States Patent
Voigt et al.

(10) Patent No.: US 10,019,363 B2
(45) Date of Patent: Jul. 10, 2018

(54) PERSISTENT MEMORY VERSIONING AND MERGING

(71) Applicant: HEWLETT PACKARD ENTERPRISE DEVELOPMENT LP, Houston, TX (US)

(72) Inventors: Douglas L. Voigt, Boise, ID (US); Charles B. Morrey, III, Palo Alto, CA (US); Jishen Zhao, San Jose, CA (US); Dhruva Chakrabarti, San Jose, CA (US); Joseph E. Foster, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/507,606

(22) PCT Filed: Apr. 3, 2015

(86) PCT No.: PCT/US2015/024346
§ 371 (c)(1),
(2) Date: Feb. 28, 2017

(87) PCT Pub. No.: WO2016/160035
PCT Pub. Date: Oct. 6, 2016

(65) Prior Publication Data
US 2017/0286297 A1    Oct. 5, 2017

(51) Int. Cl.
*G06F 13/12*    (2006.01)
*G06F 12/0817*   (2016.01)
(Continued)

(52) U.S. Cl.
CPC .......... *G06F 12/0828* (2013.01); *G06F 9/467* (2013.01); *G06F 12/1009* (2013.01);
(Continued)

(58) Field of Classification Search
CPC ... G06F 12/0828; G06F 9/467; G06F 12/1009
(Continued)

(56) References Cited

U.S. PATENT DOCUMENTS

| 7,801,866 | B1 | 9/2010 | Kathuria et al. |
| 8,612,719 | B2 | 12/2013 | Givargis et al. |

(Continued)

FOREIGN PATENT DOCUMENTS

| WO | WO-2004061676 A1 | 7/2004 |
| WO | WO-2015065333 A1 | 5/2015 |
| WO | WO-2015112148 A2 | 7/2015 |

OTHER PUBLICATIONS

International Search Report & Written Opinion received in PCT Application No. PCT/US2015/024346, dated. Apr. 22, 2016, 9 pages.

(Continued)

*Primary Examiner* — Jae Yu
(74) *Attorney, Agent, or Firm* — Hewlett Packard Enterprise Patent Department

(57) ABSTRACT

Example implementations may relate to a version controller allocating a copy page in persistent memory upon receiving, from an application executing on a processor, a copy command to version an image page for an atomic transaction. The version controller may receive application data addressed to a cache line of the image page, and may write the application data to a cache line of the copy page corresponding to the addressed cache line of the image page. If the version controller receives a replace-type transaction commit command, the version controller may generate a final page by either forward merging the image page into the copy page or backward merging the copy page into the image page, depending a merge direction policy.

15 Claims, 8 Drawing Sheets

(51) Int. Cl.
*G06F 12/1009* (2016.01)
*G06F 9/46* (2006.01)
(52) U.S. Cl.
CPC .. *G06F 2212/1032* (2013.01); *G06F 2212/60* (2013.01); *G06F 2212/621* (2013.01)
(58) Field of Classification Search
USPC .......................................................... 711/141
See application file for complete search history.

(56) References Cited

U.S. PATENT DOCUMENTS

| | | |
|---|---|---|
| 2002/0073110 A1 | 6/2002 | Duvillier et al. |
| 2003/0028723 A1* | 2/2003 | Segev ................. G06F 11/2071 711/113 |
| 2005/0283567 A1 | 12/2005 | Popescu-Stanesti et al. |
| 2009/0132780 A1 | 5/2009 | Maier et al. |
| 2011/0047334 A1 | 2/2011 | Eichenberger et al. |
| 2012/0158674 A1 | 6/2012 | Lillibridge |
| 2013/0290282 A1 | 10/2013 | Faerber et al. |
| 2015/0088822 A1 | 3/2015 | Raja et al. |

OTHER PUBLICATIONS

Tu, S. et al, "Speedy Transactions in Multicore In-memory Databases," (Research Paper), Nov. 3-6, 2013, 15 pages, available at http://web.eecs.umich.edu/~mozafari/winter2014/eecs684/papers/speedy.pdf.

* cited by examiner

PERSISTENT MEMORY VERSIONING AND MERGING

BACKGROUND

Volatile memory devices, such as dynamic random access memory devices, may be used to form working memory of computer systems, owing to their fast access times. Computer systems may store data in non-volatile mass storage devices with slower access times, such as magnetic media-based storage devices or optical media-based storage devices.

Some computer systems may also implement non-volatile memory devices that provide fast access times and preserve data when the computer system is powered off. Such non-volatile memory devices may be used to form working, persistent memory of computer systems.

BRIEF DESCRIPTION OF THE DRAWINGS

Various examples will be described below with reference to the following figures.

DETAILED DESCRIPTION

A computer system may contain working, persistent memory formed from non-volatile memory devices, such as flash memory devices, phase-change memory devices, spin-transfer torque memory devices, resistive random-access memory devices (also referred to as memristor memory devices), and the like. Such persistent memory may have fast access speeds comparable to volatile memory and also may have the ability to retain data after the computer system is powered off. Additionally, persistent memory may be implemented in a system architecture that divides memory control functionality between a memory controller on a processor and a media controller on the persistent memory, the processor and the persistent memory being connected by a memory fabric. For example, the memory controller of the processor may include cache consistency functionality and other processor-specific memory functionality, while the media controller of the persistent memory may include functionality specific to the persistent memory devices.

Owing to the ability of persistent memory to retain data, a computer system may include versioning and transaction capabilities. For example, an application executing on a processor of a computer system may determine that multiple versions of data should be maintained for a period of time. One of the versions may represent an initial state of the data, and another version may accumulate changes to the data for an atomic transaction. However, some data operations performed during versioning, such as data copying and version merging/replacement, may increase processor and/or memory overhead and may reduce computer system performance. Moreover, some implementations of versioning may exhibit overhead by virtue of performing copy-on-writes of entire pages of data.

The techniques of the present application may relate to a version controller that, in some examples, is coupled to a processor and to persistent memory. The version controller may receive application data addressed to a cache line of an image page, may write the received application data to a cache line of a copy page corresponding to the addressed cache line of the image page, may track cache lines of the copy page to which application data is written, and may generate a final page by either forward merging the image page into the copy page or backward merging the copy page into the image page depending on a merge direction policy. More particularly, some aspects of the techniques may relate to a merge direction policy that is based on a quantity of cache lines of the copy page to which application data is written. Accordingly, the techniques of the present application may be useful for offloading data versioning operations, such as data copying and version merging/replacement, from a processor to a version controller. Additionally, the techniques of the present application may be useful for reducing the amount of data movement involved in data versioning.

Figure 1:
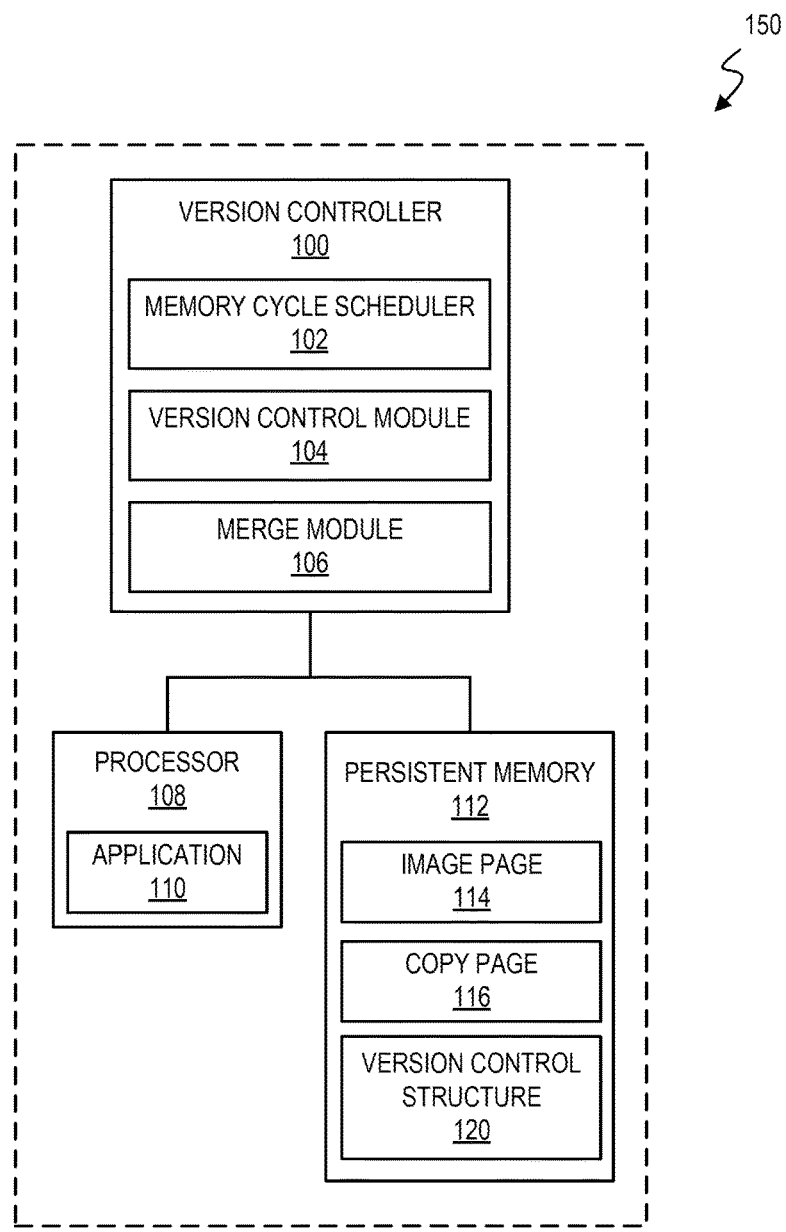
FIG. 1 is a block diagram showing an example system having a version controller to version and merge data in persistent memory.

Referring now to the figures, FIG. 1 is a block diagram showing an example version controller 100 (which also may be referred to as a controller 100). As will be described herein, the version controller 100 may include a memory cycle scheduler 102, a version control module 104, and a merge module 106, and the version controller 100 may be useful for versioning and merging data in persistent memory 112. The data may be related to write requests of an atomic transaction of an application 110 executing on a processor 108. The term "atomic," "atomically," "atomicity," or similar terms may refer to a transaction where all the operations occur, or none of the operations occur. For example, an atomic update transaction may be a transaction where all updates that make up the transaction are performed, or none of the updates are performed.

In some implementations, the processor 108 may be a single-core processor, a multi-core processor, an application-specific integrated circuit, a field programmable gate array, and/or other hardware device suitable for retrieval and/or execution of machine-executable instructions from a machine-readable medium connected to the processor 108. The machine-executable instructions may include, for example, sets of instructions that, when executed by the processor 108, form the application 110. In some implementations, persistent memory 112 may be formed from non-volatile memory devices, such as flash memory devices, phase-change memory devices, spin-transfer torque memory devices, resistive random-access memory devices (also referred to as memristor memory devices), and the like. The persistent memory 112 may be communicatively coupled to the processor 108. The version controller 100 also may be communicatively coupled to both the processor 108 and the persistent memory 112.

The version controller 100 may include a memory cycle scheduler 102, a version control module 104, and a merge module 106, each of which may be a set of instructions encoded on a machine-readable medium of a device and executable by a processor of the device, and additionally or alternatively, may include a hardware device comprising electronic circuitry for implementing the functionality described below. Moreover, it may also be understood that, in some implementations, some of the functionality of the memory cycle scheduler 102, the version control module 104, and the merge module 106 described herein may be attributed directly to the version controller 100.

The version control module 104 may allocate a copy page in persistent memory 112 communicatively coupled to the version controller 100 upon receipt of a copy command to version an image page 114 for an atomic transaction of an application 110 executing on a processor 108 communicatively coupled to the version controller 100. The memory cycle scheduler 102 may receive application data from the application 110 addressed to a cache line of the image page 114. The memory cycle scheduler 102 may write the received application data to a cache line of the copy page 116 corresponding to the addressed cache line of the image page 114. In some implementations, the version control module 104 may track, in a version control structure 120, cache lines of the copy page 116 to which application data is written. The version control module 104 may receive a transaction commit command from the application 110. The merge module 106 may, in response to the transaction commit command received by the version control module 104 being a replace command, generate a final page by either a forward merge of the image page 114 into the copy page 116 or a backward merge of the copy page 116 into the image page 114, depending on a merge direction policy. In some implementations, the version controller 100, the processor 108, and the persistent memory 112 may be included in or form part of a computing system 150, such as a server, a workstation, a desktop computer, a laptop computer, a tablet computing device, a mobile device, or the like.

Figure 2:
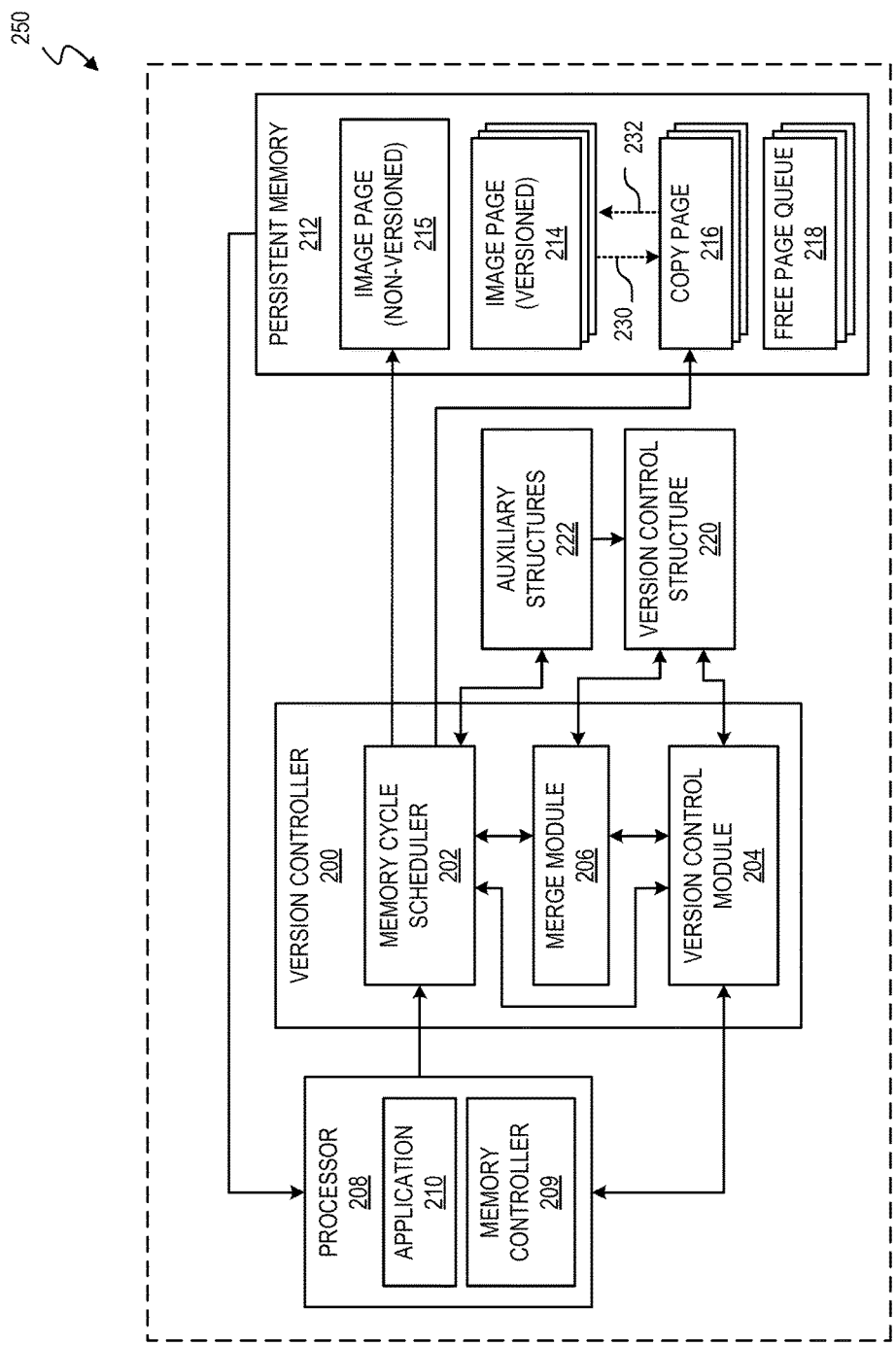
FIG. 2 is a block diagram showing an example system having a version controller to version and merge data in persistent memory.

FIG. 2 is a block diagram showing an example version controller 200 (which also may be referred to as a controller 200). As will be described herein, the version controller 200 may include a memory cycle scheduler 202, a version control module 204, and a merge module 206, and the version controller 200 may be useful for versioning and merging data in persistent memory 212. The data may be related to write requests of an atomic transaction of an application 210 executing on a processor 208.

In some implementations, the processor 208 may be a single-core processor, a multi-core processor, an application-specific integrated circuit, a field programmable gate array, and/or other hardware device suitable for retrieval and/or execution of machine-executable instructions from a machine-readable medium connected to the processor 208. The machine-executable instructions may include, for example, sets of instructions that, when executed by the processor 208, form at least one application 210. In some implementations, a plurality of applications 210 may be formed on the processor 208, including an operating system. The processor 208 also may include an integrated memory controller 209 to manage the flow of data to and from memory, such as the persistent memory 212 (although in some implementations, the memory controller 209 may be separate from but communicatively coupled to the processor 208).

In some implementations, persistent memory 212 may be formed from non-volatile memory devices, such as flash memory devices, phase-change memory devices, spin-transfer torque memory devices, resistive random-access memory devices (also referred to as memristor memory devices), and the like. The persistent memory 212 may be communicatively coupled to the processor 208, and more particularly, to the memory controller 209 of the processor 208. The version controller 200 also may be communicatively coupled to both the processor 208 and the persistent memory 212. For example, in some implementations, the version controller 200, the processor 208, and the persistent memory 212 may be communicatively coupled by an inter-socket memory fabric.

In some implementations, the version controller 200, the processor 208, and the persistent memory 212 may be included in or form part of a computing system 250, such as a server, a workstation, a desktop computer, a laptop computer, a tablet computing device, a mobile device, or the like. In addition to the version controller 200, the processor 208, and the persistent memory 212, in some implementations, the computing system 150 may also include volatile memory (e.g., dynamic random-access memory, static random-access memory, and the like), a storage device (e.g., magnetic-based storage device, optical-based storage device, or other physical storage device), and any wired or wireless network interface.

Figure 3:
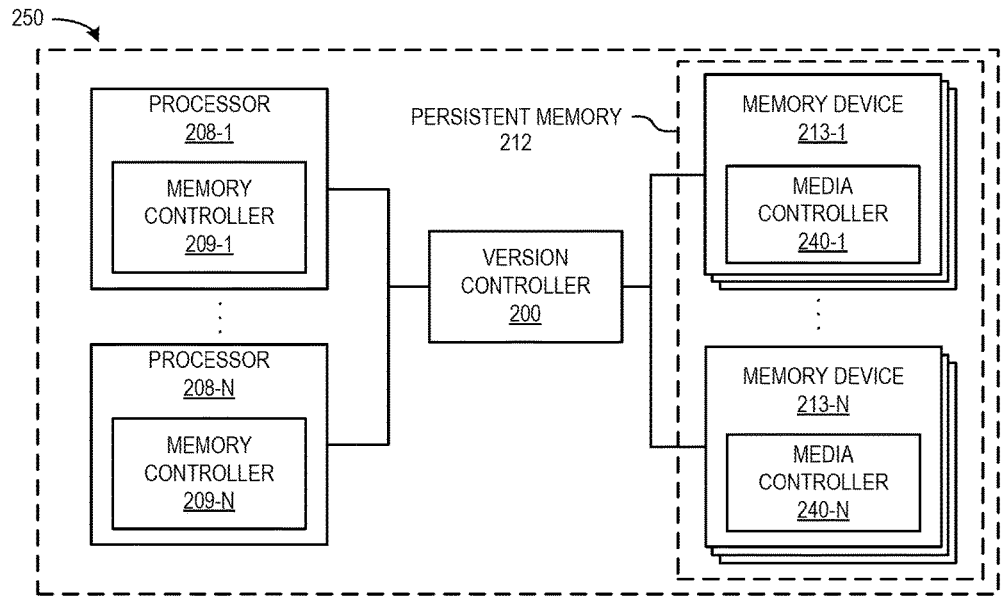
FIG. 3 is a block diagram showing an example system having a version controller to version and merge data in persistent memory.

In some implementations, as depicted in FIG. 3, the persistent memory 212 of the example system 250 may be formed from a plurality of persistent memory devices 213-1 through 213-N (e.g., multiple dual-inline memory modules), and each memory device 213-1 through 213-N may include a respective media controller 240-1 through 240-N. In some implementations, as illustrated in FIG. 3, the processor 208 of the example system 250 may be among a plurality of processors 208-1 through 208-N. Each of the processors 208-1 through 208-N may include a respective memory controller 209-1 through 209-N. Each of the persistent memory devices 213-1 through 213-N, the plurality of processors 208-1 through 208-N, and the version controller 200 may be communicatively coupled by an inter-socket memory fabric, such that any of the processors and the version controller 200 may access or communicate with any of the persistent memory devices. By virtue of the foregoing arrangement, the virtual controller 200 may perform versioning on data between the processor 208 and persistent memory 212 as an independent intermediary device.

Referring again to FIG. 2, the version controller 200 may include a memory cycle scheduler 202, a version control module 204, and a merge module 206, each of which may be a hardware device comprising electronic circuitry for implementing the functionality described below, and additionally or alternatively, may a set of instructions encoded on a machine-readable medium of a device (e.g., system 250) and executable by a processor of the device. Moreover, it may also be understood that, in some implementations, some of the functionality of the memory cycle scheduler 202, the version control module 204, and the merge module 206 described herein may be attributed directly to the version controller 200.

The version controller 200, and more particularly the version control module 204, may receive, from the application 210, a copy command to version an image page 214 for an atomic transaction of the application 210. For example, the image page 214 may be a page of data made up of a plurality of cache lines (also referred to herein as original cache lines) and stored in the persistent memory 212, and the application 208 will request modification of at least some of the original data of the image page 214 (i.e., the original cache lines) as part of an atomic transaction. The application 210 may issue the copy command because it determined that multiple versions of data (e.g., the original data and the modified data) should be maintained for the transaction for a period of time. An image page 214 being versioned by the application 210 per a copy command may also be referred to as a versioned image page.

Upon receipt of the copy command, the version control module 204 may allocate a copy page 216 in persistent memory 212, which is communicatively coupled to the version controller 200. In some implementations, the application 210 may allocate the copy page 216 and provide the physical memory address of the copy page 216 to the version controller 200 (e.g., the version control module 204) with the copy command, instead of the version control module 204 allocating the copy page 216. In some implementations, the copy page 216 as allocated does not contain any valid data that is meaningful to application 210. For example, to allocate the copy page 216, the version control module 204 may reserve an amount of the persistent memory 212 that is equivalent to the size of the image page 214 to be versioned according to the copy command, and in some implementations, does not write any data to the copy page 216. The copy page 216 may be allocated, by the version control module 204 or the application 210, from a queue of free pages 218 in persistent memory 212. In some implementations, if the queue does not have sufficient free pages from which to allocate the copy page 216, the application 210 may loan additional free pages to the queue of free pages. Additional free pages also may be added to the free page queue 218 by the version control module 204 when the version control module 204 deallocates image pages or copy pages (for example, when the pages are no longer needed for operation), as will be described below. If a deallocated page was loaned by the application 210, the application 210 may track usage of the loaned page and recover or reclaim the loaned page upon its deallocation to the free page queue 218 for other purposes of the application 210.

In some implementations, the version control module 204 also creates a version control structure 220 upon receipt of the copy command. The version control structure 220 may be stored in persistent memory of system 250 that is accessible by the version controller 200, such as persistent memory 212. The version control structure 220 may describe a corresponding copy page 216, and further may include at least some of the fields shown in Table 1, which will be described further herein.

TABLE 1

Version Control Structure for a Copy Page

| Field | Description |
| --- | --- |
| Transaction ID | May identify copy pages that are part of the same atomic transaction from the viewpoint of the application. All version control structures with the same transaction ID may be processed together atomically in response to a transaction commit command |
| Copy Page Physical Memory Address | Points to a physical memory address of the copy page corresponding to the version control structure |

TABLE 1-continued

Version Control Structure for a Copy Page

| Field | Description |
| --- | --- |
| Image Page Physical Memory Address | Points to a physical memory address of the image page corresponding to the version control structure |
| Next page, Prior Page | A doubly linked list of copy pages that are part of the same transaction |
| Master Copy Page | Points to a master (head) copy page related to the transaction ID. The Master Copy Page field for the master copy page points to the master copy page itself. |
| Master Combine Page | Points to a master (head) page of a linked list of copy pages to be combined in response to a combine-type transaction commit command. |
| Next Combine Page | Points to the next page of a linked list of copy pages to be combined in response to a combine-type transaction commit command |
| Page State | Indicates the current state of the copy page: Initial, Active, Active with Forward Merge, Committed, Deprecated, Splitting |
| Cache Line Valid | Tracks whether individual cache lines of the copy page are valid |

As shown in Table 1, some implementations of the version control structure 206 may include a Cache Line Valid field, which may track whether individual cache lines of the copy page 216 are valid. For example, the Cache Line Valid field may include a single bit for each cache line of the copy page 216 to track whether the corresponding cache line is valid or invalid. When the copy page 216 is initially allocated by the version control module 204, the Cache Line Valid field may be set or initialized to indicate that all cache lines of the copy page 216 are invalid. The Cache Line Valid field is updated to indicate that a particular cache line of the copy page 216 is valid when data from the application 210 is written to that cache line, as will be described below.

Accordingly, for a particular copy command and transaction of the application 210, the version controller 200 may perform versioning using a corresponding set of an image page 214, a copy page 216, and a version control structure 220. After allocating the copy page 216 and the version control structure 220, the version control module 206 may set the Page State field of the version control structure 200 to an Initial state. In some implementations, the transaction may relate to multiple image pages, for example, where the data being manipulated by the transaction spans multiple image pages (as but one example, each image page may be four kilobytes in size). In such a case, the version control module 204 may allocate multiple copy pages (e.g., a copy page corresponding to each of the multiple image pages) and may atomically create a version control structure 220 for each of the multiple copy pages. The version control structures for each copy page may refer to the same Transaction ID and may link multiple copy pages related to the same transaction in a doubly linked copy page list (e.g., using the Next page, Prior Page and Master Copy Page fields described in Table 1). Accordingly, it should be understood that the techniques presented herein may be performed on multiple corresponding image pages, copy pages, and version control structures.

In some implementations, the version controller 200 may process different transactions concurrently (e.g., in response to multiple copy commands, whether from the same application 210 or from different applications), and accordingly, the version controller 200 may manage multiple sets of corresponding image pages, copy pages, and version control structures.

In some implementations, in addition to the version control structure 220, the version control module 204 may also create and maintain various auxiliary structures 222. The auxiliary structures 222 may be stored in volatile memory or persistent memory of the system 250. For example, the version control module 204 may maintain, in the auxiliary structures 222, a free page list that tracks the location in persistent memory 212 of the free pages in the free page queue 218. The version control module 204 also may maintain, in the auxiliary structures 222, a transaction index that tracks the physical memory address of a copy page associated with a particular transaction (or tracks a master copy page, where multiple copy pages are involved in a transaction). The version control module 204 also may maintain, in the auxiliary structures 222, a page index that includes corresponding image page addresses and copy page addresses, and relates both the image page and the copy page to the corresponding version control structure 220. Owing at least in part to some of the foregoing auxiliary structures 222, the version controller 200 may virtualize, to the processor 208, the pages involved in a versioning operation.

In some implementations, the application 210 may modify a page table of the processor 208 such that the application 210 (and processes thereof) participating in the transaction may reference the copy page 216 in addition to or instead of the image page 214. Until at least after the version controller 200 receives a transaction commit command from the application 210 in a manner described below. By virtue of providing only the application 210 access to the copy page 216, the version controller 200 may provide an isolation property such that the transaction of application 210 does not affect concurrent transactions executing on the processor 208 and/or utilizing persistent memory 212.

The version controller 200 may receive, from application 210, a write request (e.g., a store instruction of the processor 208) and application data addressed to a cache line of a page in persistent memory 212. More particularly, in some implementations, the memory cycle scheduler 202 receives the application data and the version control module 204 receives the write request. In some implementations, the version control module 204 sets the Page State field of the version control structure 220 to Active, if not previously set to Active, when application data is received. The version controller 200 (more particularly, the memory cycle scheduler 202) may determine whether the received write request and application data are addressed to an image page involved in a transaction versioned by the version controller 200 (a versioned image page), for example, by checking if the cache line address is referenced in the auxiliary structures 222, such as the page index described above. If the write request and application data are not addressed to a versioned image page (e.g., addressed instead to a non-versioned image page 215), then the memory cycle scheduler 202 can pass the write request and application data to the persistent memory 212 without further processing by the version controller 200. On the other hand, if the write request and application data are addressed to an image page involved in a transaction versioned by the controller (e.g., versioned image page 214), the memory cycle scheduler 202 identifies the corresponding version control structure 220 and copy page 216 (e.g., from the page index).

Having identified the version control structure 220 and the copy page 216 corresponding to a write request and application data addressed to a versioned image page 214, the memory cycle scheduler 202 may write the received application data to a cache line of the copy page 216 corresponding to the addressed cache line of the image page 214 (e.g., by executing a store instruction or other instruction with a memory reference operand). That is, instead of updating or modifying the original image page 214, the version controller 200 updates or modifies the copy page 216, which serves as a new version of the image page 214. In some implementations, the memory cycle scheduler 202 schedules the write for an unused memory cycle. In some implementations, the memory cycle scheduler 202 may immediately write the application data (e.g., at a next possible cycle, without an intentional or programmed delay) after identifying the version control structure 208 and the copy page 216 corresponding to the addressed versioned image page 214.

After the memory cycle scheduler 202 writes the application data to the copy page 216, the version control module 204 may track, in the version control structure 220, the cache line of the copy page 216 to which application data is written. For example, the version control module 204 may track the written copy page cache lines by setting a bit in the Cache Line Valid field of the version control structure 220 that corresponds to the written cache line to indicate that that cache line in the copy page 216 is now valid. As but one illustration, in FIG. 4A, application data addressed to cache line 224-2 of the image page 214 has been written to corresponding cache line 226-2 of the copy page 216, and accordingly, the corresponding bit of the Cache Line Valid field 221-A (of the version control structure 220) has been set to indicate validity of that cache line 226-2 (e.g., a value of "1" in this example). On the other hand, in FIG. 4A, application data has not been written to corresponding cache lines 226-1 and 226-3, respectively, and the bits of the Cache Line Valid field 221-A corresponding to those cache lines 226-1 and 226-3 remain set to invalid (e.g., a value of "0" in this example), per the original allocation of the copy page 216.

In some implementations, the memory cycle scheduler 202 may write multiple cache lines to the copy page 216 in response to multiple write requests from the application 210 related to a particular atomic transaction, and the version control module 204 may track each of the cache lines of the copy page 216 to which application data is written. In some implementations, the memory cycle scheduler 202 may overwrite a cache line of the copy page 216 to which application data has been previously written per a more recent write request. The memory cycle scheduler 202 may continue to write (or overwrite), to the copy page 216, application data addressed to the versioned image page 214 in the manner described above until the version control module 204 receives a transaction commit command from the application 210. Before describing how the version controller 200 handles the transaction commit command, various pre-commit functionality of the version controller 200 will first be described.

In some implementations, the copy command received by the version controller 200 (i.e., the version control module 204) may include a forward merge hint. The forward merge hint indicates that the merge module 206 will perform a forward merge of the image page 214 into the copy page 216 after the version control module 204 receives the transaction commit command (in a manner described below). In some implementations, the version control module 204 sets the Page State field of the version control structure 220 to Active with Forward Merge in response to a forward merge hint. If the copy command includes a forward merge hint, the memory cycle scheduler 202 may copy corresponding cache lines of the image page 214 to cache lines of the copy page 216 to which no application data is written, prior to receipt of the transaction commit command and during unused memory cycles. In other words, the memory cycle scheduler 202 may determine which cache lines of the copy page 216 are invalid based on the Cache Line Valid field of the version control structure 220 and forward copies the corresponding cache lines of the image page 214 (i.e., original cache lines) to those invalid cache lines of the copy page 216. The version control module 204 may set bits of the Cache Line Valid field to valid, as the corresponding cache lines of the copy page 216 are forward copied due to the forward merge hint. In some implementations, the memory cycle scheduler 202 may watch for and schedule unused memory cycles to perform the forward copy so as to avoid copying cache lines at the same time that cache lines are written (such as those cache lines received from the application 210 and addressed to a versioned image page 214). By virtue of copying forward copying cache lines from the image page 214 to the copy page 216 prior to a transaction commit command and in accordance with the forward merge hint, the version controller 200 may accelerate versioning of the image page 214 by having a complete or near complete version of a final page to be committed by the time the transaction commit command is received.

In some implementations, the version controller 200 may receive requests from the processor 208 to access data of the image page 214, other than write requests as described above. The memory cycle scheduler 202 may determine whether access to the image page 214 by the processor 208, and more particularly by the application 210 and by other applications not associated with the transaction, should be directed to the image page 214 or to the copy page 216. For example, the processor 208 or an application executing on the processor 208 may send a read request (e.g., a load instruction) addressed to the image page 214. The memory cycle scheduler 202 may determine whether the read address refers to a cache line of the image page 214 that corresponds to a cache line of the copy page 216 that is valid according to the version control structure 220 (e.g., by checking the version control structure 220, directly or via the version control module 204). If the cache line of the read address corresponds to a valid cache line of the copy page 216, then the memory cycle scheduler 202 readdresses the read request to the corresponding cache line of the copy page 216. Otherwise, the memory cycle scheduler 202 may pass the original read request to the image page 214.

In some implementations, the application 210 may flush modified cache lines addressed to the image page 214 (e.g., remaining data in a cache of the processor 208) to the version controller 200 in preparation for sending a transaction commit command. The version controller 200 may process the flushed cache lines in a similar manner as described above, that is, by writing the remaining application data addressed to cache lines of the image page 214 to the corresponding cache lines of the copy page 216 and updating the version control structure 220 (e.g., the Cache Line Valid field) accordingly.

The version control module 204 may receive a transaction commit command from the application 210, such as a replace command, a split command, a combine command, or a delete command. The aforementioned commands may also be referred to herein as a replace-type command, a split-type command, a combine-type command, or a delete-type command. The response of the version controller 200 to each of the aforementioned transaction commit commands will now be described in turn.

In response to the transaction commit command being a replace command, the merge module 206 may generate a final page by either a forward merge (e.g., 230) of the image page 214 into the copy page 216 or a backward merge (e.g., 232) of the copy page 216 into the image page 214, depending on a merge direction policy. In some implementations, the memory cycle scheduler 202 may schedule unused memory cycles for the merge module 206 to perform the forward merge 230 or the backward merge 232 to generate the final page. The merge direction policy may be included in the merge module 206, and various implementations of the merge direction policy will be described below. Before describing implementations of the merge direction policy, the forward merge 230 and the backward merge 232 will first be described.

If the merge direction policy dictates that a forward merge 230 should be performed, the version control module 204 may set the Page State field of the version control structure 220 to Committed (which may indicate that the copy page 216 will be maintained as the final page, and the image page 214 is deemed a deprecated page that will be deallocated). The merge module 206 may determine which cache lines of the copy page 216 are invalid based on the Cache Line Valid field of the version control structure 220 and may control or instruct the memory cycle scheduler 202 to schedule unused memory cycles to forward copy the corresponding original cache lines of the image page 214 to those invalid cache lines of the copy page 216. The version control module 204 may update the version control structure 220 as cache lines of image page 214 are copied to corresponding cache lines of the copy page 216 by setting each corresponding bit of the Cache Line Valid field to valid, and the forward copy 230 may be deemed complete after all bits of the Cache Line Valid field are set to valid. The version control module 204 may provide the physical memory address of the final page, i.e., the copy page 216, to the application 210 (or more generally, to the processor 208). The physical memory address may be provided from the Copy Page Physical Memory Address field of the version control structure 220, for example. The processor 208 may then update its page table such that any virtual addresses originally mapped to the physical memory address of the image page 214 will instead be mapped to the physical memory address of the copy page 216 (as the final page) for future read and write requests.

If the merge direction policy dictates that a backward merge 232 should be performed, the version control module 204 may set the Page State field of the version control structure 220 to Deprecated (which indicates that the image page 214 will be maintained as the final page, and the copy page 216 will be deallocated). The merge module 206 may determine which cache lines of the copy page 216 are valid based on the Cache Line Valid field of the version control structure 220 and may control or instruct the memory cycle scheduler 202 to schedule unused memory cycles to backward copy those valid cache lines of the copy page 216 to the corresponding cache lines of the image page 214. The version control module 204 may update the version control structure 220 as cache lines of copy page 216 are copied to corresponding cache lines of the image page 214 by setting each corresponding bit of the Cache Line Valid field to invalid as that cache line is copied. The version control module 204 may provide the physical memory address of the final page, i.e., the image page 214, to the application 210 (or the processor 208), and, in some implementations, the page table of the processor 208 may not need to be updated. The physical memory address may be provided from the Image Page Physical Memory Address field of the version control structure 220, for example.

In some implementations, the version control module 204 may provide the physical memory address of the final page to the processor 208, including any applications or processes executing thereon, after setting the Page State field to Committed for a forward merge 230 or to Deprecated for a backward merge 232, but before the forward merge 230 or backward merge 232 is completed and before all bits of the Cache Line Valid field are set to valid or invalid, respectively. In such an implementation, the processor 208 may effectively access the final page (even though the final page has not been completely generated and valid cache lines are scattered between the image page 214 and the copy page 216) by virtue of the version controller 200 tracking, in the version control structure 220, where each valid cache line is during the ongoing forward or backward merge. In other implementations, the version controller module 204 may provide the physical memory address of the final page after the forward merge 230 or the backward merge 232 is completed.

Figure 4A:
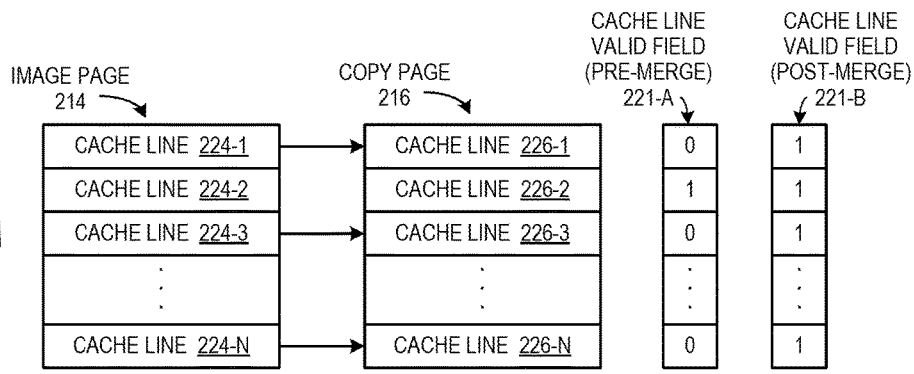
FIG. 4A illustrates a forward merge operation according to an example implementation.
Figure 4B:
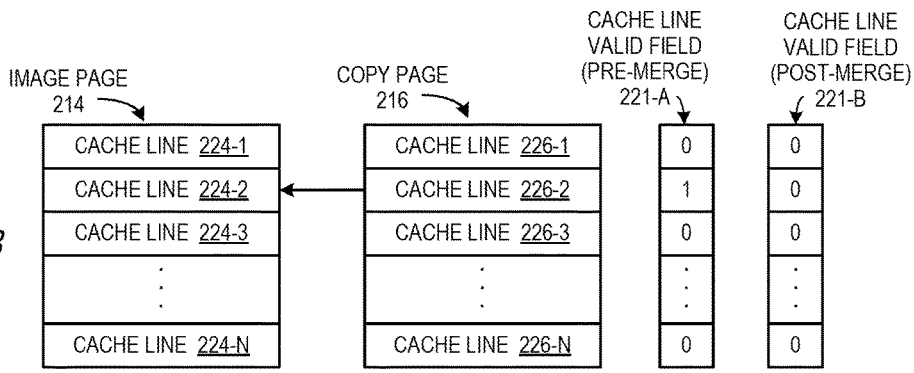
FIG. 4B illustrates a backward merge operation according to an example implementation.

To illustrate, FIG. 4A depicts a forward merge by copying corresponding original cache lines 224-1, 224-3, and 224-N of the image page 214 to invalid cache lines 226-1, 226-3, and 226-N of the copy page 216 (e.g., in accordance with Cache Line Valid field 221-A). After the depicted forward merge is completed, all bits of the Cache Line Valid field should be set to valid (e.g., all bits of Cache Line Valid field 221-B are set to "1" in FIG. 4A). FIG. 4B depicts a backward merge by copying the valid cache line 226-2 of the copy page 216 to the cache line 224-2 of the image page 214 (e.g., in accordance with Cache Line Valid field 221-A). After the depicted backward merge is completed, all bits of the Cache Line Valid field 221 should be set to invalid (e.g., all bits of Cache Line Valid field 221-B are set to "0" in FIG. 4B).

Example implementations of the merge direction policy that may govern whether a forward merge 230 or a backward merge 232 is performed will now be described. In some implementations, the merge direction policy may be based on a quantity of cache lines of the copy page 216 to which application data is written. For example, the merge module 206 may determine a percentage of bits of the Cache Line Valid field (of the version control structure 220) that are valid, and the merge direction may depend on whether the percentage meets or exceeds a threshold. More particularly, in some examples, the merge direction may be a forward merge 230 if the percentage of valid cache lines in the copy page 216 is 50% or greater and may be a backward merge 232 if the percentage of valid cache lines in the copy page 216 is less than 50%. It should be understood that the percentage threshold may be modified, for example, to optimize the efficiency of the version commit process. Other quantity-based measures also may be used in a similar manner in other implementations, such as a count of the valid cache lines. By virtue of the merge direction policy being based on the quantity of valid cache lines in the copy page 216, the version controller 200 may copy cache lines towards the page that is most similar to the final page, thus potentially minimizing the number of cache line copy operations to create a final page.

In some implementations, the merge direction policy may be based on a quantity of virtual addresses of the processor 208 that refer to the image page 214. For example, after a forward merge 230 is performed (i.e., when the Page State is set to Committed), each instance in the page table of the processor 208 where a virtual memory address is mapped to the physical memory address of the image page 214 is re-mapped to the physical memory address of the copy page 216, as described above. As the number of such virtual memory address increases, the number of re-mappings performed by the processor 208 may also increase. Accordingly, it may be deemed more efficient to perform a backward merge than to re-map a high quantity or number of virtual memory addresses to the physical memory address of the copy page 216. It should be understood that the quantity of virtual addresses of the processor 208 may be selected, for example, to optimize the efficiency of the version commit process.

In some implementations, the version control module 204 may remove references in the system 250 to a deprecated page. The deprecated page may be whichever of the image page 214 or the copy page 216 that is not merged into to form the final page, or in other words, the deprecated page may be the image page 214 in a forward merge 230 and may be the copy page 216 in a backward merge 232. The version control module 204 may remove references to the deprecated page in, for example, the page table of the processor 208. In some implementations, the version control module 204 may remove references to the deprecated page after the Page State field is set in the version control structure 220 to Committed or Deprecated.

In some implementations, the version control module 204 also may deallocate the deprecated page, for example, by releasing (e.g., making available) the deprecated page to the free page queue 218 and updating the free page list in the auxiliary structures 222 or by releasing the deprecated page to the application 210 or the processor 208. In some implementations, the version control module 204 also may deallocate the version control structure 220. In some implementations, the version control module 204 waits until references to the deprecated page in the system 250 (e.g., in the processor 208) are removed, as indicated by a release command from the processor 208 or the application 210 for example, before deallocating the deprecated page and/or the version control structure 220.

In some implementations, the transaction commit command received by the version control module 204 from the application 210 may be a delete command. For example, the application 210 may issue a delete command when the transaction of the application 210 is aborted. In response to a delete command, the version control module 204 may deallocate the version control structure 220 and the copy page 216. By virtue of the response to the delete command, only the original unmodified image page 214 may remain.

In some implementations, the transaction commit command received by the version control module 204 from the application 210 may be a split command. In response to the transaction commit command being a split command, the version control module 204 may set the Page State field of the version control structure 220 to Splitting, and the merge module 206 may copy original cache lines from the image page 214 to the copy page 216 for cache lines of the copy page 216 to which no application data is written (i.e., the corresponding bits of the Cache Line Valid field of the version control structure 220 are set to invalid). In other words, the merge module 206 may perform a forward merge 230. In some implementations, if the version controller 200 receives new application data addressed to a cache line of the image page 214 and the corresponding cache line of the copy page 216 is invalid, the memory cycle scheduler 202 may schedule writing the new application data to the image page 214 after writing the cache line of the image page 214 to the invalid cache line of the copy page 216. The foregoing data copy and write processes of the split command may be performed during unused memory cycles, as scheduled by the memory cycle scheduler 202, in the manner described above. Moreover, the foregoing data copy and write processes may be performed using a forward merge hint, in the manner described above. The version controller 200 may provide both the physical memory address of the split copy page 216 and the physical memory address of the image page 214 to the processor 208 (and more particularly, to the application 210), and may delete the version control structure 220. By virtue of the response to the split command, the processor 208 may retain access to both the original data in the image page 214 and the transaction-modified data in the copy page 216.

In some implementations, the transaction commit command received by the version control module 204 from the application 210 may be a combine command. In response to the transaction commit command being a combine command, the version controller 200 may atomically combine or add a copy page from a first transaction and another copy page from a second transaction. Moreover, in cases where transactions relate to multiple copy pages, the version controller 200 may atomically combine or add a first set of copy pages from a first transaction to a second set of copy pages from a second transaction. The version controller 200 may combine copy pages by, for example, modifying the linked list fields of version control structures (such as the Master Combine Page and the Next Combine Page fields) of the copy pages to be combined. For example, the linked list fields for a first set of copy pages may be modified to incorporate the second set of copy pages, and/or vice versa. The first transaction and the second transaction may both be transactions of the application 210.

As the copy page(s) of a first transaction and copy page(s) of a second transaction are being combined, the merge module 206 may determine whether any potential combine conflicts exist, by determining whether a copy page (of the first transaction) and another copy page (of the second transaction) are both versions of the same image page. For example, the merge module 206 may check whether one or more fields, such as the Image Page Physical field, of the version control structures for the copy pages of the first transaction match corresponding fields for the copy pages of the second transaction. If the copy page and the another copy page are both versions of the same image page, the merge module 206 may then determine if a conflict exists, a conflict being where data has been written to corresponding cache lines of both the copy page and the another copy page. For example, the merge module 206 may check the version control structures for both the copy page and the another copy page, and if any corresponding Cache Line Valid bits of the copy page and the another copy page are both set to valid, a conflict may be deemed to exist by the merge module 206. By virtue of both corresponding cache lines being valid, neither the version controller 200 nor the application 210 may be able to determine which of the copy page or the another copy page contains the desired (e.g., most up-to-date) application data. If no conflict exists, the merge module 206 may combine or link the copy page 216 and the another copy page. If a conflict exists, the version controller 200 may send an error message to the processor 208 and/or the application 210, which in turn, may abort both the first transaction and the second transaction. After the copy pages of the first transaction and the copy pages of the second transaction are combined, the version controller 200 may send the physical memory addresses of the combined pages to the processor 208 and/or the application 210.

Figure 5:
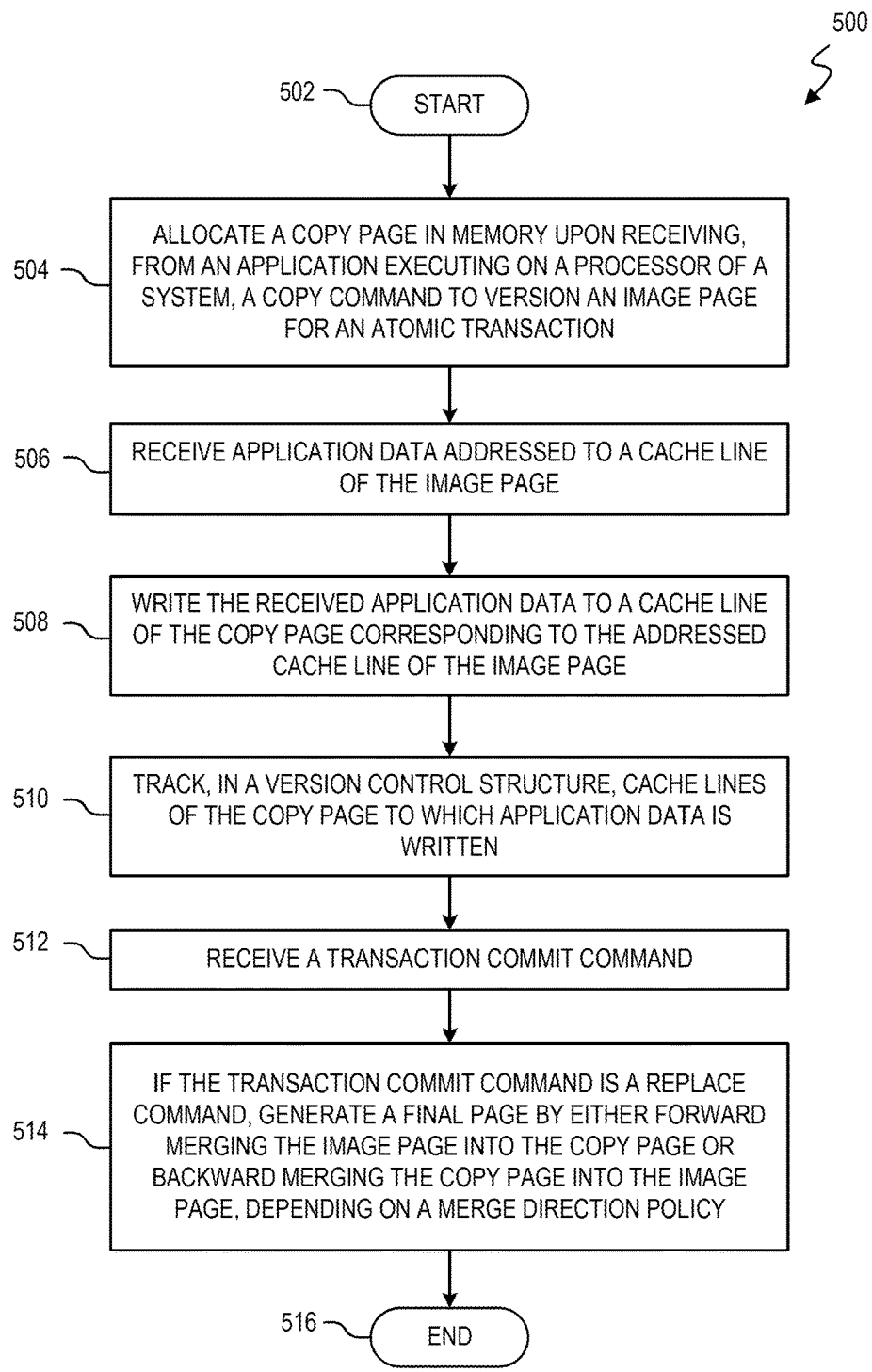
FIG. 5 is a flow diagram of an example method for versioning and merging data in persistent memory.

FIG. 5 is a flow diagram of an example method 500 for versioning and merging of data in persistent memory. Method 500 may be described below as being executed or performed by a system, such as system 150 of FIG. 1. Various other suitable systems may be used as well, such as, for example, system 250 of FIG. 2. Method 500 may be implemented in the form of executable instructions stored on at least one machine-readable storage medium and executed by at least one processor or controller of the system 150, and/or in the form of electronic circuitry. In some implementations of the present disclosure, one or more blocks of method 500 may be executed substantially concurrently or in a different order than shown in FIG. 5. In some implementations of the present disclosure, method 500 may include more or less blocks than are shown in FIG. 5. In some implementations, one or more of the blocks of method 500 may, at certain times, be ongoing and/or may repeat.

Method 500 may start at block 502 and continue to block 504, where a system 150 may allocate, by a version controller 100 for example (more particularly, by a version control module 104), a copy page (e.g., 116) in persistent memory (e.g., 112) upon receiving, from an application (e.g., 110) executing on a processor (e.g., 108) of the system 150, a copy command to version an image page (e.g., 114) for an atomic transaction. In some implementations, the copy command is to version a plurality of image pages, and in response, the version control module 104 may allocate a plurality of corresponding copy pages.

At block 506, the system 150 may receive, at the version controller 100 (more particularly, at the memory cycle scheduler 102), application data addressed to a cache line of the image page 114. At block 508, the system 150 may write, by the version controller 100 (more particularly, by the memory cycle scheduler 102), the received application data (i.e., received at block 506) to a cache line of the copy page 116 corresponding to the addressed cache line of the image page 114. At block 510, the system 150 may track, in a version control structure (e.g., 120), cache lines of the copy page 116 to which application data is written at block 508. More particularly, in some implementations, the version controller 100 (or more particularly, the version control module 104) performs the tracking in the version control structure 120, and the version control structure may be stored in the version controller 100 (e.g., an on-board machine-readable medium, cache, or storage), the persistent memory 112, or another memory or storage of the system 150. The version control structure 120 may be, for example, analogous to the version control structure 220 described above with respect to FIG. 2. In some implementations, the application 110 sends application data addressed to the image page 114 over a period of time (e.g., over a plurality of consecutive and/or non-consecutive cycles of the processor 108), and the version controller 100 may repeat blocks 506, 508, and 510 for each application data received.

At block 512, the system 150 may receive, at the version controller 100 (more particularly, at the version control module 104), a transaction commit command. In some implementations, the transaction commit command may be sent by the application 110. If the transaction commit command received at block 512 is a replace command, then at block 514, the version controller 100 (more particularly, the merge module 106) may generate a final page by either forward merging the image page 114 into the copy page 116 or backward merging the copy page 116 into the image page 114, depending a merge direction policy. In other words, by virtue of performing block 514, the copy page 116 becomes the final page via a forward merge or the image page 114 becomes the final page via a backward merge. In some implementations, the version control module 104 may track, in the version control structure 120, progress of the forward merge or the backward merge, as the case may be. For example, in the case of a forward merge, the version control structure 120 may indicate whether a cache line of the copy page 116 is in a final state, that is, whether the cache line of the copy page 116 was previously written to with application data at block 508 or was previously copied to with a corresponding cache line of image page 114 via a forward merge at block 514. Similarly, in the case of a backward merge, the version control structure 120 may indicate whether a cache line of the image page 114 is in a final state, that is, whether data was copied to the cache line of the image page 114 from the corresponding cache line of the copy page 116 via a backward merge at block 512 if that cache line of the copy page 116 was previously written to with application data at block 508.

In some implementations, the merge direction policy 514 may be based on a quantity (e.g., a percentage, a count, etc.) of cache lines of the copy page 116 to which application data is written by block 508 or a quantity of virtual addresses mapped to the image page 114. After block 514, method 500 may end at block 516.

Figure 6:
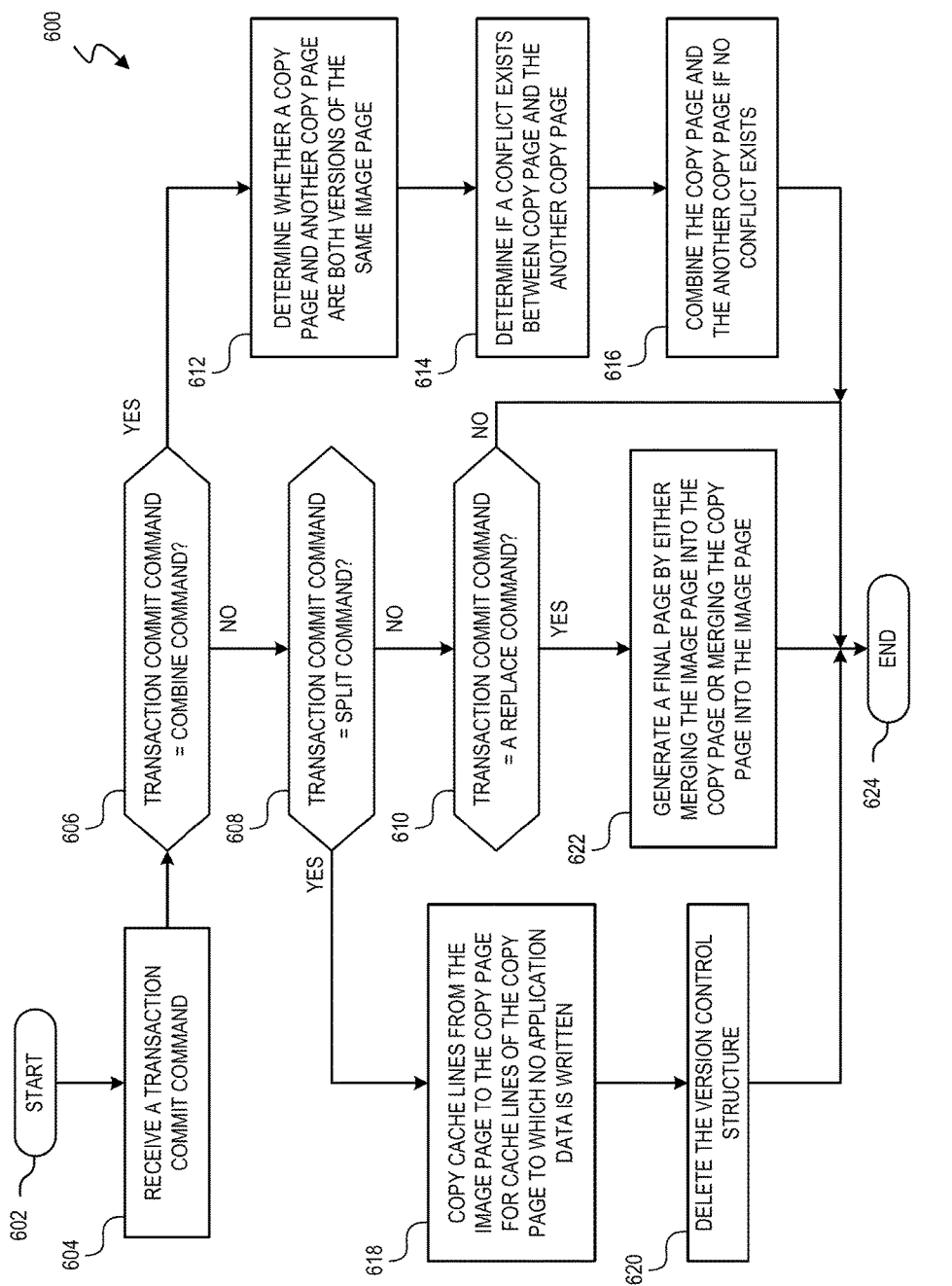
FIG. 6 is a flow diagram of an example method for responding to a transaction commit command.

FIG. 6 is a flow diagram of an example method 600 for versioning and merging of data in persistent memory. Method 600 may be described below as being executed or performed by a system, such as system 250 of FIG. 2. Various other suitable systems may be used as well, such as, for example, system 150 of FIG. 1. Method 600 may be implemented in the form of executable instructions stored on at least one machine-readable storage medium and executed by at least one processor or controller of the system 250, and/or in the form of electronic circuitry. In some implementations of the present disclosure, one or more blocks of method 600 may be executed substantially concurrently or in a different order than shown in FIG. 6. In some implementations of the present disclosure, method 600 may include more or less blocks than are shown in FIG. 6. In some implementations, one or more of the blocks of method 600 may, at certain times, be ongoing and/or may repeat.

Method 600 may start at block 602 and continue to block 604, where the version controller 200 (more particularly, the version control module, e.g., 204) may receive a transaction commit command from an application 210. Block 604 may be analogous in many respects to block 512 of method 500, and in some implementations, method 600 may be performed after block 512 of method 500. For example, prior to receiving the transaction commit command at block 604, the version controller 200 may have allocated a copy page (e.g., 216) in persistent memory (e.g., 212), may have received application data addressed to a cache line of an image page (e.g., 214), may have written the received application data to a cache line of a copy page 216 corresponding to the addressed cache line of the image page 214, and may have tracked cache lines of the copy page 216 to which application data is written in a version control structure (e.g., 220). The transaction commit command received at block 604 may be, for example, a combine command, a split command, or a replace command.

At block 606, if the transaction commit command is a combine command ("YES" at block 606), control passes to block 612, which will be described below. If the transaction commit command is not a combine command ("NO" at block 606) but is a split command ("YES" at block 608), control passes to block 618, which will be described below. If the transaction commit command is not a combine command ("NO" at block 606) or a split command ("NO" at block 608) but is a replace command ("YES" at block 610), control passes to block 622. Block 622 may be analogous in many respects to block 514 of method 500, and the system 250 may generate, by the version controller 200 (more particularly, the merge module 206), a final page by either merging the image page 214 into a copy page 216 (a forward merge, e.g., 230) or merging the copy page 216 into the image page 214 (a backward merge, e.g., 232), based on a merge direction policy. If the transaction commit command is neither a combine command ("NO" at block 606), a split command ("NO" at block 608), nor a replace command ("NO" at block 610), method 600 may end at block 624. In some implementations, method 600 may include functionality for handling other transaction commit commands, such as a delete command (as described above with respect to the version controller 200). Moreover, it should be understood that in some implementations, blocks 606, 608, and 610 may be performed in any combination thereof or as a single block.

If the transaction commit command is a combine command ("YES" at block 606), the version controller 200 may atomically combine or add a first set of copy pages from a first transaction to a second set of copy pages from a second transaction. In some implementations, the copy pages from both the first transaction and the second transaction may have been created by prior execution of method 500 of FIG. 5, for example. As the first set of copy pages and the second set of copy pages are being combined, the version controller 200 (more particularly, the merge module 206) may perform block 612 to determine whether a copy page (e.g., of the first transaction) and another copy page (e.g., of the second transaction) are both versions of the same image page. At block 614, the version controller 200 (more particularly, the merge module 206) may determine if a conflict exists, a conflict being where data has been written to corresponding cache lines of both the copy page (e.g., of the first transaction) and the another copy page (e.g., of the second transaction). At block 616, the version controller 200 (more particularly, the merge module 206) may combine or link the copy page and the another copy page if no conflict exists (as determined at block 614) by, for example modifying linked list fields of the version control structure corresponding to the copy page to incorporate and the another copy page and/or vice versa.

If the transaction commit command is a split command ("YES" at block 606), control may pass to 618, where the version controller 200 (more particularly, the merge module 206) may copy cache lines from the image page 214 to the copy page 216 for cache lines of the copy page 216 to which no application data is written (according to the version control structure 220). At block 620, the version controller 200 (more particularly, the version control module 204) may delete the version control structure 220. The version controller 200 may provide the physical memory address of both the image page 214 and the copy page 216 to the processor 208 and/or the application 210, such that both versions are available for future transactions. Method 200 may eventually continue to block 624 (e.g., after blocks 610, 616, 620, 622), where method 200 may end.

Figure 7:
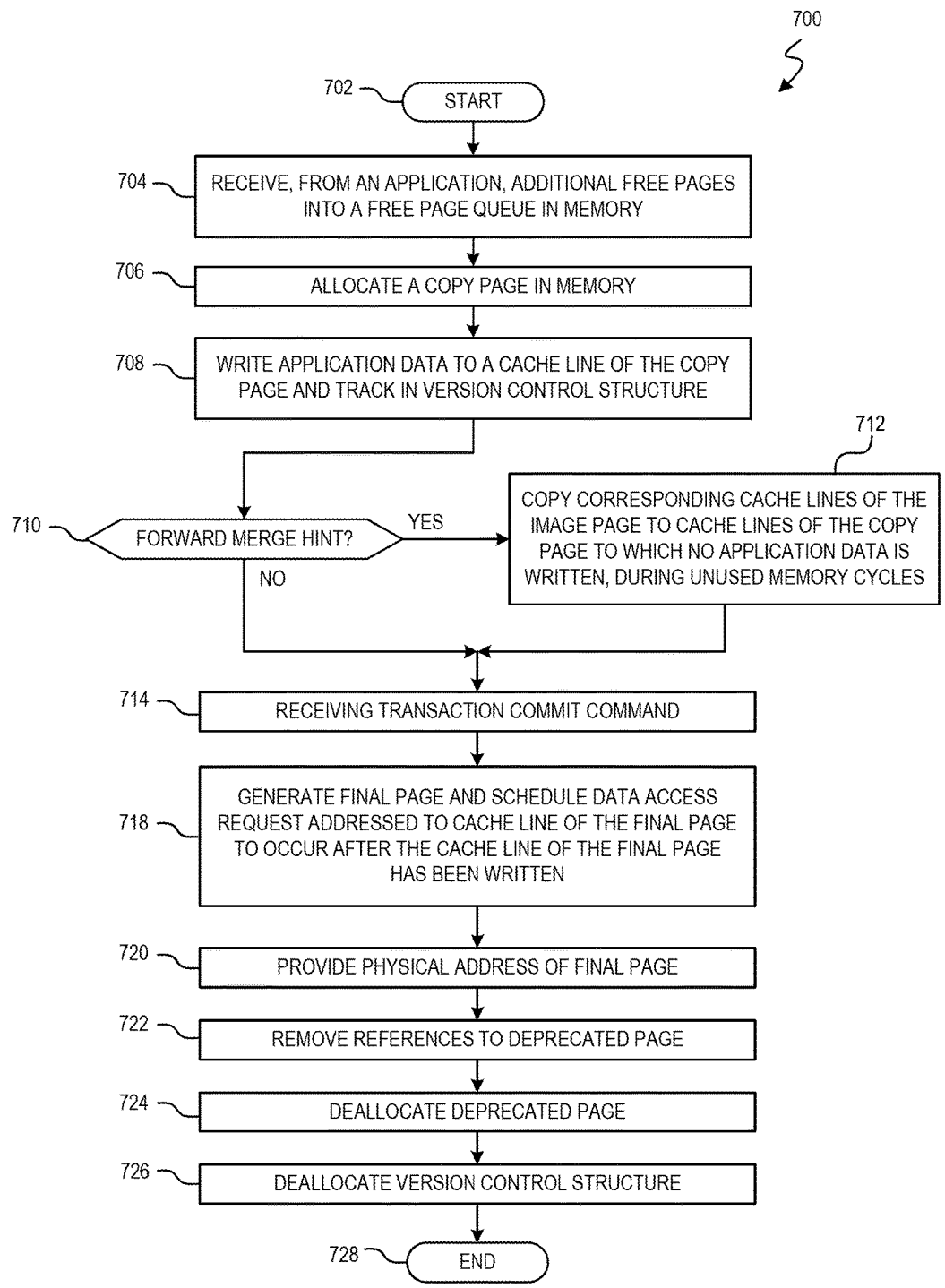
FIG. 7 is a flow diagram of an example method for versioning and merging data in persistent memory.

FIG. 7 is a flow diagram of an example method 700 for versioning and merging of data in persistent memory. Method 700 may be described below as being executed or performed by a system, such as system 250 of FIG. 2. Various other suitable systems may be used as well, such as, for example, system 150 of FIG. 1. Method 700 may be implemented in the form of executable instructions stored on at least one machine-readable storage medium and executed by at least one processor or controller of the system 250, and/or in the form of electronic circuitry. In some implementations of the present disclosure, one or more blocks of method 700 may be executed substantially concurrently or in a different order than shown in FIG. 7. In some implementations of the present disclosure, method 700 may include more or less blocks than are shown in FIG. 7. In some implementations, one or more of the blocks of method 700 may, at certain times, be ongoing and/or may repeat.

Method 700 may start at block 702 and continue to block 704, where the system 250 may receive, from an application (e.g., 210) executing on a processor (e.g., 208), additional free pages into a free page queue (e.g., 218) in the persistent memory (e.g., 212). At block 706, the version controller 200 (more particularly, a version control module, e.g., 204) may allocate a copy page (e.g., 216) from the free page queue 218 in response to receiving, from application 210, a copy command to version an image page (e.g., 214) for an atomic transaction of the application 210. At block 708, the version controller 200 may receive application data addressed to a cache line of the image page 214, may write the application data to a cache line of the copy page 216 corresponding to the addressed cache line of the image page 214, and may track in a version control structure (e.g., 220) the cache line of the copy page 216 to which data is written (e.g., by setting a corresponding bit of a Cache Line Valid field of the version control structure 220 to valid). In some implementations, block 708 may be analogous in many respects to blocks 506, 508, and 510 of method 500, collectively.

At block 710, if the copy command includes a forward merge hint, control passes to block 712, and the version controller 200 (particularly, the memory cycle scheduler 202), may copy corresponding cache lines of the image page 214 to cache lines of the copy page 216 to which no application data is written, prior to receiving a transaction commit command (as described below with respect to block 714) and during unused memory cycles. If the copy command does not include a forward merge hint, the version controller 200 does not copy cache lines of the image page 214 to the copy page 216 in advance of receiving a transaction commit command.

At block 714, the version controller 200 (more particularly, the version control module 204) may receive a transaction commit command from the application 210. In connection with the transaction commit command, the application 210 may also flush modified cache lines (e.g., from a cache of the processor 208) to the version controller 200, and in response, the version controller 200 may receive the flushed cache lines and write each of the cache lines in a manner similar to that described above with respect to block 708. The application 210 may flush the cache lines (and the version controller 200 may receive the flushed cache lines), for example, preceding receipt of the transaction commit command, concurrently with receipt of the transaction commit command, or following receipt of the transaction commit command, by the version controller 200.

At block 718, the version controller 200 (i.e., the merge module 206) may generate a final page in a manner analogous to block 514 of method 500, by merging the image page 214 into a copy page 216 (a forward merge 230) or merging the copy page 216 into the image page 214 (a backward merge 232), based on a merge direction policy. Additionally, at block 718, the version controller 200 (more particularly, the version control module 104) may track, in the version control structure 220, progress of the forward merge 230 or the backward merge 232, as the case may be. For example, the version control module 104 may use the Cache Line Valid field of the version control structure 220 to track merge progress on a per cache line basis. In particular, the Cache Line Valid field may indicate whether a cache line has been copied by the forward merge 230 or the backward merge 232 (and thus is deemed to be in a final state) or needs to be copied under the forward merge 230 or the backward merge 232 (and thus is deemed to not yet be in a final state).

During block 718, as the version controller 200 is merging the image page 214 and the copy page 216 to generate the final page, the version controller 200 may control access to the persistent memory 212 such that the processor 208 (including any applications or processes executing on the processor 208, such as application 210) may effectively access the final page when attempting to access either the image page 214 or the copy page 216. In some implementations, it may be understood that by virtue of the version controller 200 tracking, in the version control structure 220, which cache lines are in a final state with respect to the forward or backward merge (as the case may be), the processor 208 may access (read or write) data in the final page as if the final page were completed, even if the version controller 200 is yet in the process of generating the final page and valid cache lines may be scattered or dispersed between the image page 214 and the copy page 216. During block 718, the version controller 200 may receive a data access request (read or write) from the processor 208 addressed to the final page, and more particularly, to a cache line of either the image page 214 or the copy page 216 that has not reached its final state, such as, for example, a cache line of the copy page 216 yet to be copied from the image page 214 for a forward merge 230 or a cache line of the image page 214 yet to be copied from the copy page 216 per a backward merge 232. Such a data access request may potentially conflict with ongoing merging at block 718 (ongoing merge activity, including the physical memory addresses of cache lines to be copied during block 218, may be tracked in a cache lines in-flight table). For example, if the data access request is to write new data to a cache line of the final page before that cache line has reached its final state, that new data in the cache line of the final page may eventually be erroneously overwritten by the forward or backward merge of block 218. To mitigate such a conflict, the memory cycle scheduler 200 of the version controller 200 may manage the data access by at least one of the following conflict avoidance actions. In some implementations, the version controller 200 may address the data access request (in particular, for a read request) to the cache line of the image page 214 if the corresponding bit of the Cache Line Valid field is invalid and may address the request to the copy page 216 if the corresponding Cache Line Valid field is valid. In some implementations, the version controller 200 (more particularly, the memory cycle scheduler 202) may manage scheduling conflicts arising from the data access requests (i.e., read or write requests) by, for example, scheduling the data access request to occur after the corresponding cache line has been copied per the forward merge 230 or the backward merge 232 and has thus reached its final state.

At block 720, the version controller 200 (i.e., the version control module 204) may provide a physical memory address of the final page to the application 210 (and/or to the processor 208, in some implementations). At block 722, the version controller 200 (more particularly, the version control module 204) may remove references in the processor 208 (or more generally, in the system 250) to a deprecated page or may cause the references to the deprecated page to be removed from the processor 208, the deprecated page being whichever of the image page 214 or the copy page 216 is not merged into in block 718. In other words, if a forward merge is performed in block 718 to form the final page, the image page 214 may be deemed the deprecated page, and if a backward merge is performed in block 718, the copy page 214 may be deemed the deprecated page. References in the processor 208 to the deprecated page may be in a page table or in applications or processes (such as application 210), for example. In some implementations, the processor 208 removes references to the deprecated page in response to an instruction or request from the version controller 200.

At block 724, the version controller 200 (more particularly, the version control module 204) may deallocate the deprecated page. In some implementations, the version controller 200 may wait until block 722 is completed (and references to the deprecated page in the processor 208 are removed) before performing block 724 to deallocate the deprecated page. For example, the version controller 200 may wait for and receive a release command from the processor 208 that signals or indicates that references to the deprecated page have been removed and block 722 has been completed.

At block 726, the version controller 200 (more particularly, the version control module 204) may deallocate the version control structure 220. In some implementations, the version controller 200 may wait until block 722 is completed before performing block 726. For example, the version controller 200 may wait for and receive a release command from the processor 208 (which may be the same release command described above at block 724) before performing block 726. More particularly, after block 722 is complete and the version controller 200 receives a release command from the processor 208, the version controller 200 may perform block 724 and block 726 simultaneously or sequentially (e.g., by starting block 724 before block 726 or by starting block 726 before block 724), for example. After block 726, method 200 may end at block 728.

Figure 8:
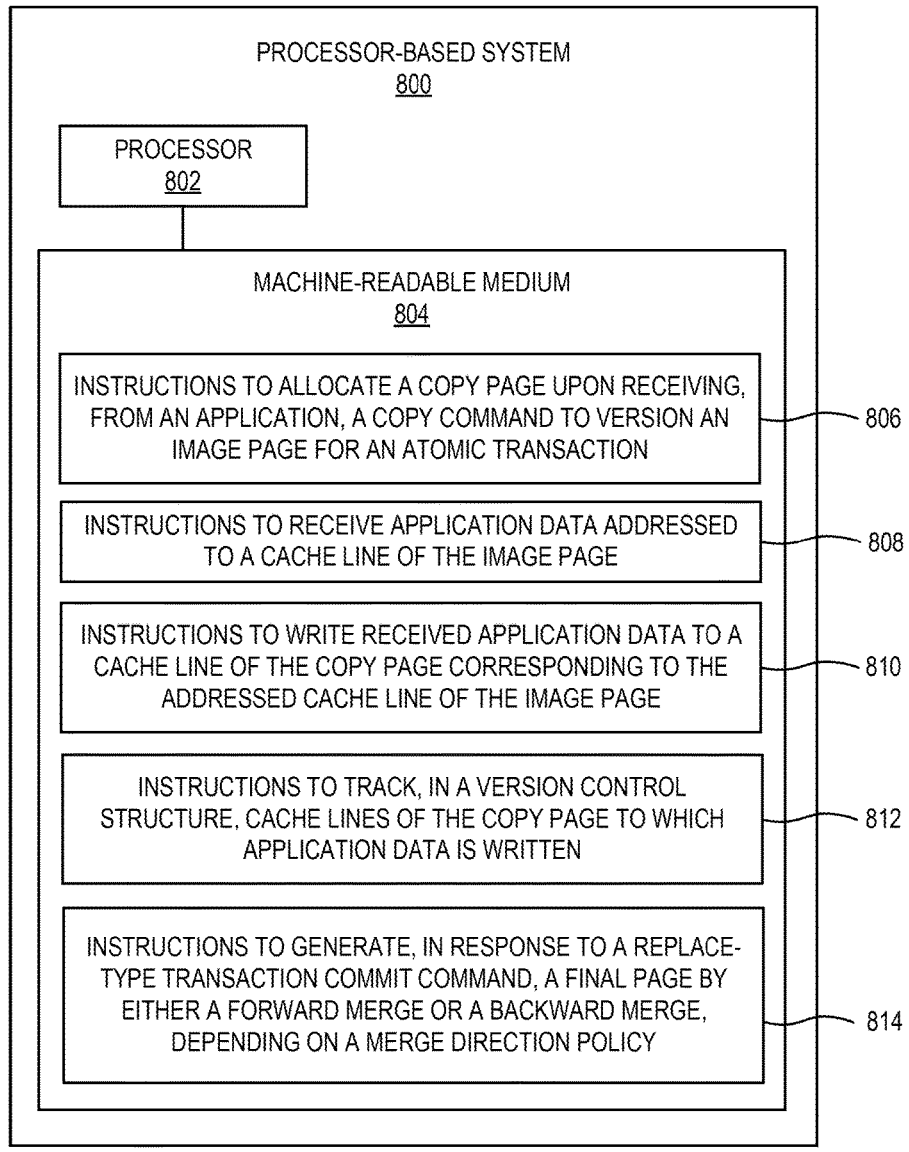
FIG. 8 is a block diagram showing a non-transitory, machine-readable medium encoded with example instructions to version and merge data in persistent memory.

FIG. 8 is a block diagram illustrating a system 800 that includes a machine-readable medium encoded with instructions to version and merge data in persistent memory according to an example implementation. In some example implementations, the system 800 may be or form part of a computing device, such as a server, a workstation, a desktop computer, a laptop computer, a tablet computing device, a mobile device, or the like. In some implementations, the system 800 is a processor-based system and may include a processor 802 coupled to a machine-readable medium 804. The processor 802 may include a single-core processor, a multi-core processor, an application-specific integrated circuit, a field programmable gate array, and/or other hardware device suitable for retrieval and/or execution of instructions from the machine-readable medium 804 (e.g., instructions 806, 808, 810, 812, 814) to perform the various functions discussed herein. Additionally or alternatively, the processor 802 may include electronic circuitry for performing the functionality described herein, including the functionality of instructions 806, 808, 810, 812, and/or 814. With respect to the executable instructions represented as boxes in FIG. 8, it should be understood that part or all of the executable instructions and/or electronic circuits included within one box may, in alternate implementations, be included in a different box shown in the figures or in a different box not shown.

The machine-readable medium 804 may be any medium suitable for storing executable instructions, such as random access memory (RAM), electrically erasable programmable read-only memory (EEPROM), flash memory, hard disk drives, optical discs, and the like. In some example implementations, the machine-readable medium 804 may be a tangible, non-transitory medium, where the term "non-transitory" does not encompass transitory propagating signals. The machine-readable medium 804 may be disposed within system 800, as shown in FIG. 8, in which case the executable instructions may be deemed "installed" on the system 800. Alternatively, the machine-readable medium 804 may be a portable (e.g., external) storage medium, for example, that allows system 800 to remotely execute the instructions or download the instructions from the storage medium. In this case, the executable instructions may be part of an "installation package." As described further herein below, the machine-readable medium 804 may be encoded with a set of executable instructions 806, 808, 810, 812, 814.

Instructions 806, when executed by the processor 802, may allocate a copy page in persistent memory upon receiving, from an application executing on the processor-based system 800, a copy command to version an image page for an atomic transaction. Instructions 808, when executed by the processor 802, may receive application data addressed to a cache line of the image page. For example, the application data may be received from an application or process executing on the processor 802, or more generally, executing on the processor-based system 800. Instructions 810, when executed by the processor 802, may write the received application data (e.g., received by instructions 808) to a cache line of the copy page corresponding to the addressed cache line of the image page. Instructions 812, when executed by the processor 802, may track, in a version control structure, cache lines of the copy page to which application data is written (e.g., written by instructions 810). Instructions 814, when executed by the processor 802, may generate, in response to receipt of a replace-type transaction commit command, a final page by either a forward merge of the image page into the copy page or a backward merge of the copy page into the image page, depending on a merge direction policy. In some implementations, the transaction commit command may be received from the application or process executing on the processor 802 (or processor-based system 800) that sent the copy command and/or the application data. In some implementations, the merge direction policy is based on a quantity of cache lines of the copy page to which application data is written or a quantity of virtual addresses in a page table of the processor-based system 800 (or more particularly, a page table of the processor 802) that are mapped to the image page.

Figure 9:
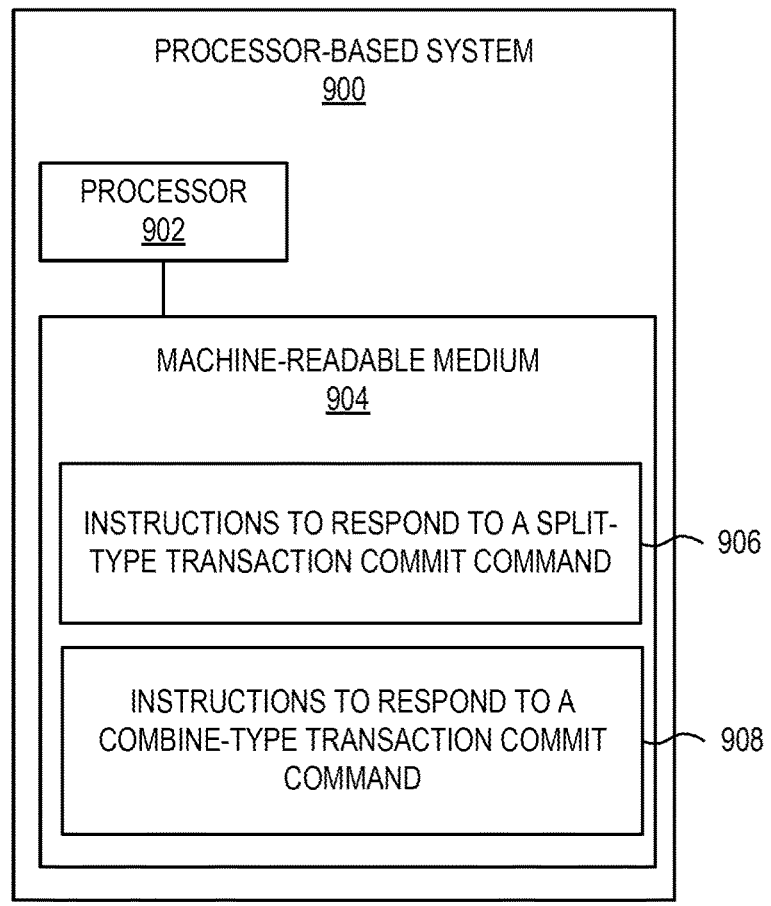
FIG. 9 is a block diagram showing a non-transitory, machine-readable medium encoded with example instructions to respond to a transaction commit command.

FIG. 9 is a block diagram illustrating a system 900 that includes a machine-readable medium encoded with instructions to version and merge data in persistent memory according to an example implementation. In some example implementations, the system 900 may be or form part of a computing device, such as a server, a workstation, a desktop computer, a laptop computer, a tablet computing device, a mobile device, or the like. In some implementations, the system 900 is a processor-based system and may include a processor 902 coupled to a machine-readable medium 904. The processor 902 may include a single-core processor, a multi-core processor, an application-specific integrated circuit, a field programmable gate array, and/or other hardware device suitable for retrieval and/or execution of instructions from the machine-readable medium 904 (e.g., instructions 906, 908) to perform the various functions discussed herein. Additionally or alternatively, the processor 902 may include electronic circuitry for performing the functionality described herein, including the functionality of instructions 906, 908. With respect to the executable instructions represented as boxes in FIG. 9, it should be understood that part or all of the executable instructions and/or electronic circuits included within one box may, in alternate implementations, be included in a different box shown in the figures or in a different box not shown.

The machine-readable medium 904 may be any medium suitable for storing executable instructions, such as random access memory (RAM), electrically erasable programmable read-only memory (EEPROM), flash memory, hard disk drives, optical discs, and the like. In some example implementations, the machine-readable medium 904 may be a tangible, non-transitory medium, where the term "non-transitory" does not encompass transitory propagating signals. The machine-readable medium 904 may be disposed within system 900, as shown in FIG. 9, in which case the executable instructions may be deemed "installed" on the system 900. Alternatively, the machine-readable medium 904 may be a portable (e.g., external) storage medium, for example, that allows system 900 to remotely execute the instructions or download the instructions from the storage medium. In this case, the executable instructions may be part of an "installation package." As described further herein below, the machine-readable medium 904 may be encoded with a set of executable instructions 906, 908.

Instructions 906, when executed by the processor 902, may respond to receipt of a split-type transaction commit command and copy cache lines from the image page to the copy page for cache lines of the copy page to which no application data is written, and delete the version control structure. In some implementations, instructions 906 may provide physical memory addresses of the copy page and of the image page to the application. Instructions 908, when executed by the processor 902, may respond to receipt of a combine-type transaction commit command, determine whether the copy page and another copy page are both versions of the same image page, determine if a conflict exists, a conflict being where data has been written to corresponding cache lines of both the copy page and the another copy page, and link or combine the copy page and the another copy page if no conflict exists. In some implementations, the split-type or combine-type transaction command may be received from an application or process executing on the processor 902, or more generally, executing on the processor-based system 900.

In view of the foregoing description, it can be appreciated that operations for versioning data on persistent memory, such as data copying and version merging/replacement, may be offloaded from a processor of a computing system to a version controller and also may be performed in an efficient manner that minimizes data copying and data movement. Additionally, by virtue of merging versioned data in either a forward or backward direction depending on a merge direction policy, data copying may be minimized during transactional version management.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A method comprising:
   allocating a copy page in persistent memory upon receiving, from an application executing on a processor of a system, a copy command to version an image page for an atomic transaction;
   receiving, at a version controller, application data addressed to a cache line of the image page;
   writing, by the version controller, the received application data to a cache line of the copy page corresponding to the addressed cache line of the image page;
   tracking, in a version control structure, cache lines of the copy page to which application data is written;
   receiving a transaction commit command; and
   if the transaction commit command is a replace command, generating, by the version controller, a final page by either forward merging the image page into the copy page or backward merging the copy page into the image page, depending a merge direction policy.

2. The method of claim 1, wherein the merge direction policy is based on a quantity of cache lines of the copy page to which application data is written or a quantity of virtual addresses mapped to the image page.

3. The method of claim 1, further comprising,
   if the transaction commit command is a split command:
      copying cache lines from the image page to the copy page for cache lines of the copy page to which no application data is written; and
      deleting the version control structure; and
   if the transaction commit command is a combine command:
      determining whether the copy page and another copy page are both versions of the same image page;
      determining if a conflict exists, a conflict being where data has been written to corresponding cache lines of both the copy page and the another copy page; and
      combining the copy page and the another copy page if no conflict exists.

4. The method of claim 1, further comprising, if the copy command includes a forward merge hint, copying corresponding cache lines of the image page to cache lines of the copy page to which no application data is written, prior to receiving the transaction commit command and during unused memory cycles.

5. The method of claim 1, further comprising:
   scheduling a data access request from the processor addressed to a cache line of the final page to occur after the cache line of the final page has been written by either the forward merge or the backward merge;
   providing a physical address of the final page to the application;
   removing references in the processor to a deprecated page that is whichever of the image page or the copy page is not merged into in the generating the final page;
   deallocating the deprecated page after the removing references; and
   deallocating the version control structure.

6. The method of claim 1, further comprising receiving, from the application, additional free pages into a free page queue in the persistent memory, wherein copy pages are allocated from the free page queue.

7. A version controller comprising:
   a version control module to:
      allocate a copy page in persistent memory communicatively coupled to the version controller upon receipt of a copy command to version an image page for an atomic transaction of an application executing on a processor communicatively coupled to the version controller,
      track, in a version control structure, cache lines of the copy page to which application data is written, and receive a transaction commit command from the application;

a memory cycle scheduler to:
  receive application data from the application addressed to a cache line of the image page, and
  write the received application data to a cache line of the copy page corresponding to the addressed cache line of the image page; and
a merge module to, in response to the transaction commit command being a replace command, generate a final page by either a forward merge of the image page into the copy page or a backward merge of the copy page into the image page, depending on a merge direction policy.

8. The version controller of claim 7, wherein the merge direction policy is based on a quantity of cache lines of the copy page to which application data is written.

9. The version controller of claim 7, wherein the merge direction policy is based on a quantity of virtual addresses in a page table of the processor that refer to the image page.

10. The version controller of claim 7, wherein the memory cycle scheduler is to:
  determine whether access to the image page by the application and by other applications not associated with the transaction should be directed to the image page or to the copy page,
  schedule unused memory cycles for the merge module to perform the forward merge or the backward merge to generate the final page, and
  if the copy command includes a forward merge hint, the memory cycle scheduler is to copy corresponding cache lines of the image page to cache lines of the copy page to which no application data is written, prior to receipt of the transaction commit command and during unused memory cycles.

11. The version controller of claim 7, wherein the merge module is to, in response to the transaction commit command being a split command:
  copy cache lines from the image page to the copy page for cache lines of the copy page to which no application data is written, and
  delete the version control structure.

12. The version controller of claim 7, wherein the merge module is to, in response to the transaction commit command being a combine command:
  determine whether the copy page and another copy page are both versions of the same image page,
  determine if a conflict exists, a conflict being where data has been written to corresponding cache lines of both the copy page and the another copy page, and
  combine the copy page and the another copy page if no conflict exists.

13. A non-transitory machine readable medium storing instructions executable by a processor of a processor-based system, the non-transitory machine readable medium comprising:
  instructions to allocate a copy page in persistent memory upon receiving, from an application executing on the processor-based system, a copy command to version an image page for an atomic transaction;
  instructions to receive application data addressed to a cache line of the image page;
  instructions to write the received application data to a cache line of the copy page corresponding to the addressed cache line of the image page;
  instructions to track, in a version control structure, cache lines of the copy page to which application data is written; and
  instructions to generate, in response to receipt of a replace-type transaction commit command, a final page by either a forward merge of the image page into the copy page or a backward merge of the copy page into the image page, depending on a merge direction policy.

14. The non-transitory machine readable medium of claim 13, further comprising:
  instructions to, in response to receipt of a split-type transaction commit command, copy cache lines from the image page to the copy page for cache lines of the copy page to which no application data is written, and delete the version control structure; and
  instructions to, in response to receipt of a combine-type transaction commit command, determine whether the copy page and another copy page are both versions of the same image page, determine if a conflict exists, a conflict being where data has been written to corresponding cache lines of both the copy page and the another copy page, and link the copy page and the another copy page if no conflict exists.

15. The non-transitory machine readable medium of claim 13, wherein the merge direction policy is based on a quantity of cache lines of the copy page to which application data is written or a quantity of virtual addresses in a page table of the processor-based system that are mapped to the image page.

* * * * *